(12) United States Patent
Abdulrahman et al.

(10) Patent No.: US 11,730,148 B2
(45) Date of Patent: Aug. 22, 2023

(54) REEF REPLACEMENT SYSTEM

(71) Applicant: Reef Arabia for Marine Wealth Co. WLL, Riffa (BH)

(72) Inventors: Halel Khaled Yusuf Abdulrahman, Manama (BH); Michael Kevin Arora, Manama (BH); David James Lennon, Victoria (AU)

(73) Assignee: Reef Arabia for Marine Wealth Co. WLL, Riffa (BH)

( * ) Notice: Subject to any disclaimer, the term of this patent is extended or adjusted under 35 U.S.C. 154(b) by 30 days.

(21) Appl. No.: 16/625,124

(22) PCT Filed: Jun. 22, 2018

(86) PCT No.: PCT/IB2018/054619
§ 371 (c)(1),
(2) Date: Dec. 20, 2019

(87) PCT Pub. No.: WO2018/235045
PCT Pub. Date: Dec. 27, 2018

(65) Prior Publication Data
US 2020/0146267 A1 May 14, 2020

(30) Foreign Application Priority Data

Jun. 22, 2017 (BH) .................................. 20170121
Aug. 16, 2017 (GC) .................................. 2017-33844

(51) Int. Cl.
*A01K 61/77* (2017.01)

(52) U.S. Cl.
CPC .................................. *A01K 61/77* (2017.01)

(58) Field of Classification Search
CPC .................................. A01K 61/77; A01K 61/70
See application file for complete search history.

(56) References Cited

U.S. PATENT DOCUMENTS

| | | | | | |
|---|---|---|---|---|---|
| 3,704,687 | A | * | 12/1972 | Nohmura | A01K 61/70 119/221 |
| 5,071,285 | A | * | 12/1991 | Van Doren | E02B 3/046 405/35 |
| 5,215,406 | A | * | 6/1993 | Hudson | E02B 3/046 119/221 |

(Continued)

FOREIGN PATENT DOCUMENTS

| | | | |
|---|---|---|---|
| CN | 205071877 U | * | 3/2016 |
| EP | 0345184 A1 | | 12/1989 |

(Continued)

OTHER PUBLICATIONS

WO-2014160450-A1, Estradas (Year: 2014).*

(Continued)

*Primary Examiner* — Monica L Perry
*Assistant Examiner* — Brittany A Lowery
(74) *Attorney, Agent, or Firm* — Maier & Maier, PLLC

(57) ABSTRACT

A reef replacement system including: a front vertical open side having a horizontal lower edge and a parabolic upper edge, an upper layer extending from said parabolic upper edge to a height approximately equivalent to the height of said lower edge, wherein said system also includes at least two super-imposed cavities underneath said upper layer.

13 Claims, 3 Drawing Sheets

(56) References Cited

U.S. PATENT DOCUMENTS

| | | | | |
|---|---|---|---|---|
| 6,089,191 A | * | 7/2000 | Calinski | A01K 61/70 |
| | | | | 119/239 |
| 6,962,130 B1 | * | 11/2005 | Kennedy | A01K 61/70 |
| | | | | 119/221 |
| 8,147,165 B2 | * | 4/2012 | Sung | A01G 33/00 |
| | | | | 119/221 |

FOREIGN PATENT DOCUMENTS

| | | | | |
|---|---|---|---|---|
| JP | S499791 U | | 1/1974 | |
| JP | S52132891 U | | 10/1977 | |
| JP | S52132892 U | | 10/1977 | |
| WO | WO-2014160450 A1 | * | 10/2014 | A01K 61/10 |

OTHER PUBLICATIONS

CN-205071877-U, Liao (Year: 2016).*
International Search Report and Written Opinion dated Oct. 12, 2018 in corresponding International Application No. PCT/IB2018/054619; 15 pages.
International Preliminary Report on Patentability dated Oct. 12, 2018 in corresponding International Application No. PCT/IB2018/054619; 15 pages.

* cited by examiner

REEF REPLACEMENT SYSTEM

FIELD

The present disclosure relates to the field of artificial reef systems. More particularly, the present invention notably relates to a concrete reef replacement system and to the methods for producing said reef.

BACKGROUND

The degradation of natural marine habitats is widespread worldwide. In the Arabian Gulf, coastal development has physically removed or smothered natural three dimensional habitats. Similar impacts are felt further afield and primarily as a result of anthropogenic activities.

The rehabilitation of marine habitats is not new and the use of artificial reefs has been employed for centuries.

For example, the sinking of old vessels has been employed for creating artificial reefs on the floor of the oceans. However, a number of corals do not grow well on metal, and many species of fish will not reproduce near or inside of hollow metal structures.

A number of designs for artificial reefs and sea walls have been suggested in the prior art as an alternative to sunken vessels.

The perfect artificial reefs must comprise surfaces for coral and other sea life to attach and grow, while providing limited resistance to the flow of water from tides and current.

More recently, artificial reefs using concrete are becoming more common place. The use of concrete provides a stable and long lasting structure both as a substrate for corals but also a habitat for fish and invertebrates. Many of the designs are specific to certain purposes (e.g. provision of fish habitat) and there is a need for a design that combine a fish habitat and a hard substrate system onto which reef building corals can colonise naturally.

SUMMARY

Accordingly, the present invention relates to a reef replacement system comprising:
- a front vertical open side having a horizontal lower edge and a parabolic upper edge,
- an upper layer extending from said parabolic upper edge to a height approximately equivalent to the height of said lower edge, wherein said system also comprises at least two super-imposed cavities underneath said upper layer.

According to a preferred embodiment, the reef replacement system according to the invention further comprises at least one horizontal outer platform extending from the exterior surface of said upper layer.

According to a preferred embodiment, said super-imposed cavities are separated by a flat horizontal platform extending from said front vertical open side to the interior surface of said upper layer.

According to a preferred embodiment, the reef replacement system according to the invention comprises at least one footing and more preferably three footings extending vertically from the lowest level of the interior surface of said parabolic upper edge to underneath said flat horizontal platform.

According to a preferred embodiment, the reef replacement system according to the invention is made of concrete and even more preferably of marine grade concrete.

According to a preferred embodiment, the reef replacement system according to the invention is obtained by moulding.

According to a preferred embodiment, the rugosity of the exterior surface of said upper layer is comprised between 0.08 and 0.1 and more preferably is 0.09.

According to a preferred embodiment, the slope formed by said upper layer is between 30° and 50°.

According to a preferred embodiment, the reef replacement system according to the invention further comprises a hole extending from the upper surface of said upper layer to one of the super-imposed cavities.

According to a more preferred embodiment, the reef replacement system according to the invention comprises two holes in the lowest part of the edge of said upper layer, extending from the outer surface of said upper layer to the lowest super-imposed cavity.

The organic appearance of the reef replacement system according to the invention enables it to rise from the seabed in a gradual manner and in a non-obtrusive manner.

Its high rugosity surface (i.e. exposure of aggregate within the concrete mix), provides suitable surfaces for the natural colonisation of corals. As used herein, the term "rugosity" refers to the surface rugosity index (C) using the formula $C=1-d/l$.

Its low lying caves with two main frontal openings, supported by three rear low lying apertures allows fish to seek refuge from any high prevailing water currents but also predators. The two base apertures are specifically designed to have a low height, a preference of *Epinephelus* spp.

These and other objects and features of the invention will be apparent from the description, drawings, and claims which follow.

DETAILED DESCRIPTION

With reference to the drawings, the preferred embodiment of the present invention will be described. For purposes of the present discussion, the terms "horizontal," "vertical," "upper," "lower," "top" and "bottom" refer to the orientation of the reef replacement system as it is depicted in the figures.

Figure 1:
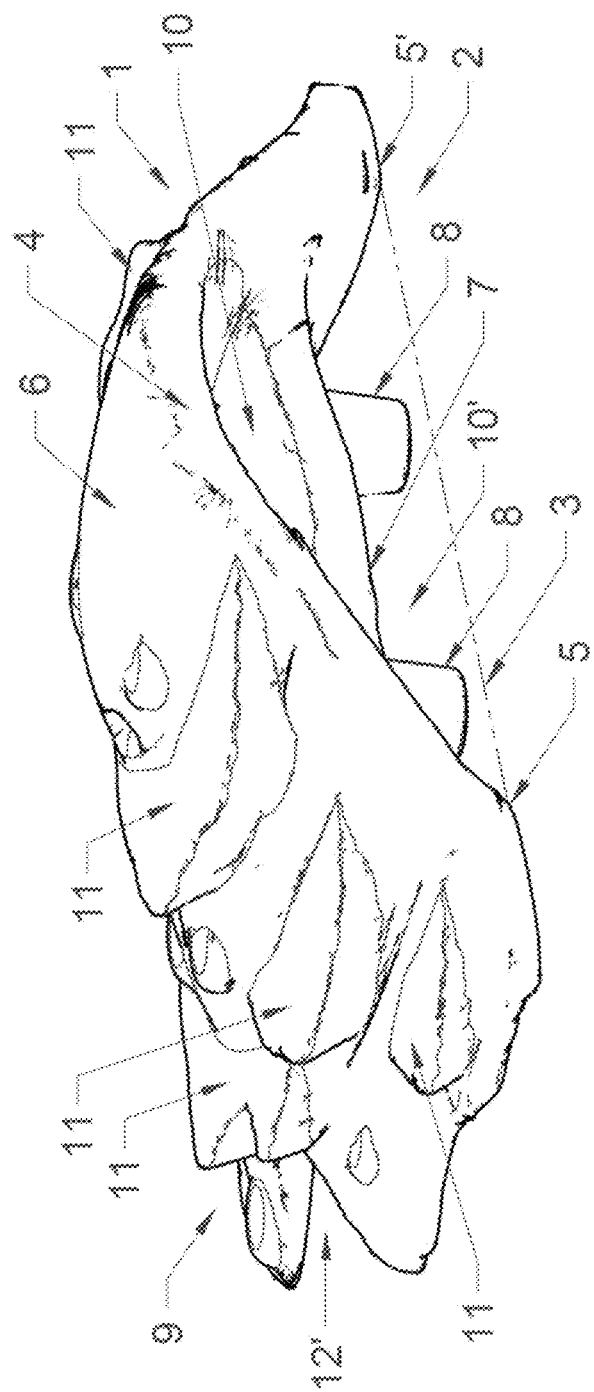
FIG. 1 is a front elevation view of a preferred embodiment of the invention.
Figure 2:
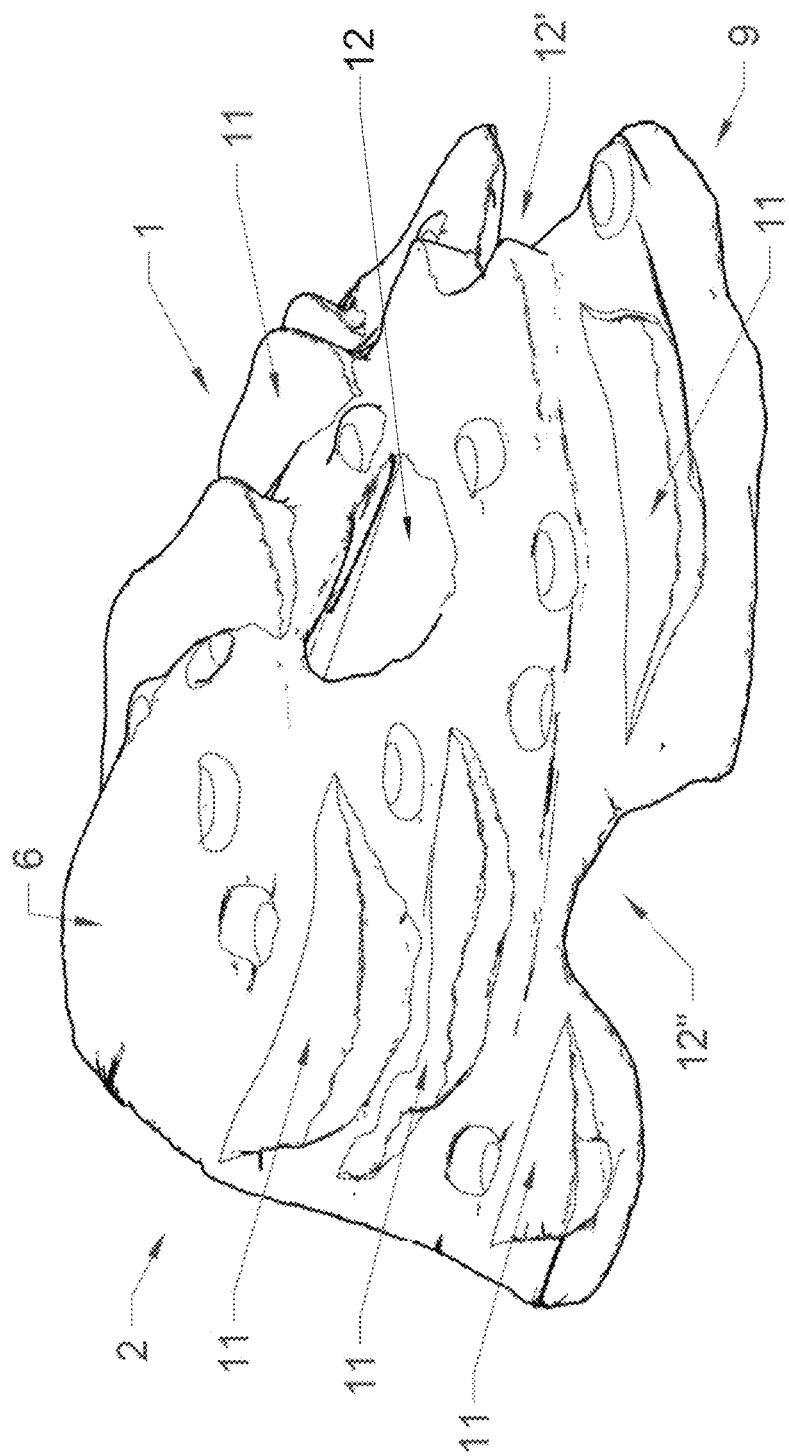
FIG. 2 is a rear elevation view of a preferred embodiment of the invention.
Figure 3:
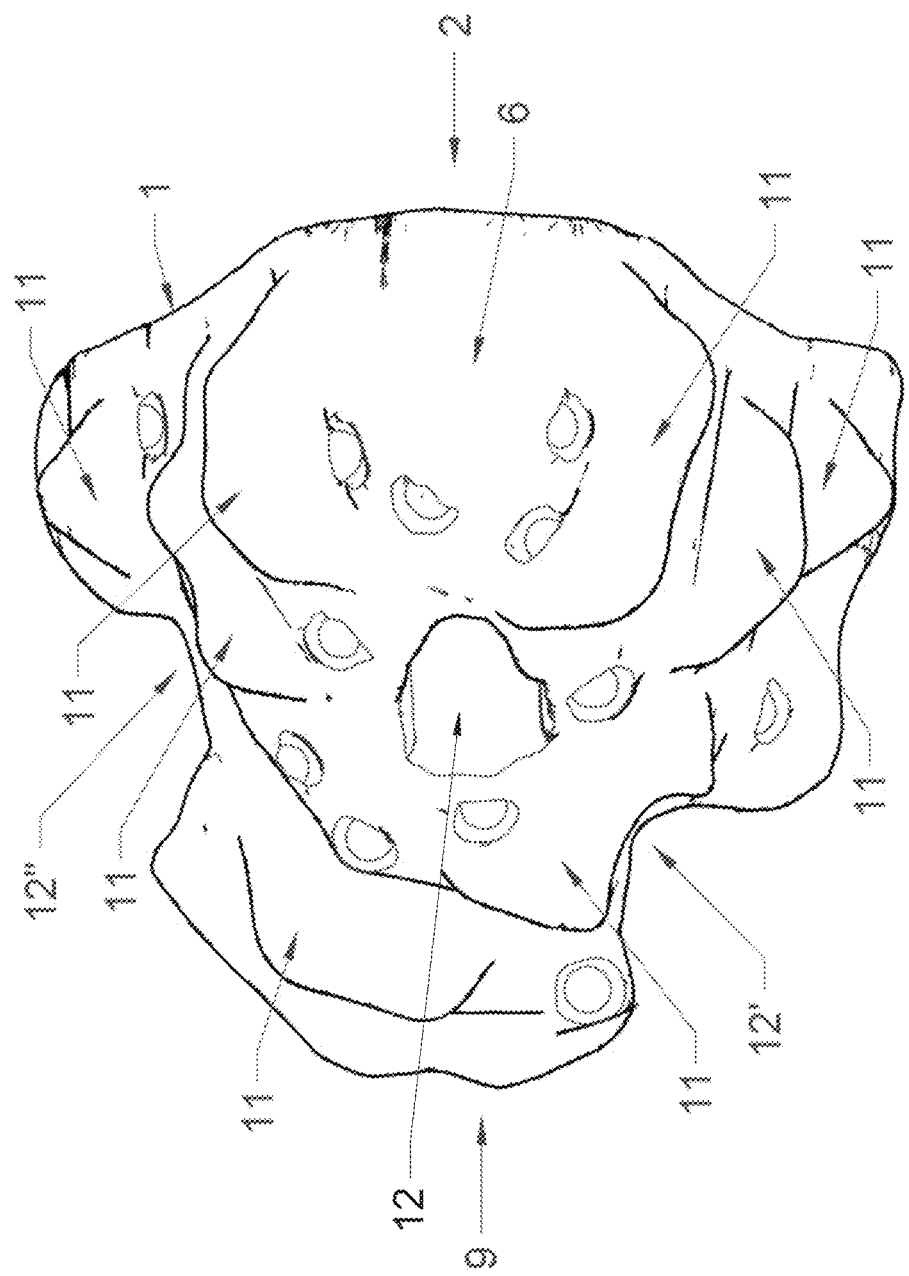
FIG. 3 is a top view of a preferred embodiment of the invention.

As seen in these figures the reef replacement system 1 according to the invention comprises a front vertical open side 2 having a horizontal lower edge 3 and a parabolic upper edge 4. Said lower edge 3 can be delimited by a physical structure forming the bottom of said reef replacement system. Alternatively, according to a preferred embodiment of the invention, said lower edge is formed by the imaginary line between the two opposite lowest point 5, 5' of the parabolic upper edge 4. As it is apparent on FIGS. 1-2, said lowest point 5, 5' are in contact with the floor of the ocean and marks said horizontal lower edge 3.

The parabolic upper edge 4 is defined by the front edge of the upper layer interior surface 6. In the context of this invention, the term "parabolic" refers to pure parabolic form but also to arch-like or Gaussian curve like forms.

The term "open" refers to the fact that said front side forms enables access to the whole internal cavities of the reef replacement system 1 according to the invention. More particularly, the term "open" refers to the fact that no physical structures, except the flat horizontal platform 7 or the footings 8, are interfering with the internal cavities access from the product front side 2 according to the invention.

The term "vertical" refers that said open side 2 is strictly vertical. Alternatively, to a preferred embodiment of the invention, said vertical open side can work its way down toward the inside of said reef replacement system 1. Advantageously, this latter embodiment provides an upper protection for the fish habitat inside the reef replacement system 1. According to an even more preferred embodiment of this invention, said vertical open side 2 forms an angle with the vertical comprised between 0° and 30°.

According to a preferred embodiment of the invention, said parabolic upper edge 4 is, at its highest point, between 400 mm and 800 mm high, more preferably between 500 mm and 700 mm high and very particularly preferably 600 mm high.

According to a preferred embodiment of the invention, said parabolic upper edge 4 is, at its lowest point, between 1600 mm and 2400 mm wide, more preferably between 1800 mm and 2200 mm wide and very particularly preferably 2000 mm wide.

The upper layer 6 extends from said parabolic upper edge 4 to a height approximately equivalent to the height of said lower edge 3. In the context of the present invention, it has to be understood that it is the superior surface of said upper layer 6 which extends from said parabolic upper edge 4 to a height approximately equivalent to the height of said lower edge 3. With this respect, said exterior surface forms a slope extending downward from the parabolic upper edge summit 4 to the soil. According to a preferred embodiment, the slope formed by said upper layer 6 is between 30° and 50°.

According to a preferred embodiment of the invention, said exterior surface of the upper layer 6 has a flattened hemi-dome shape.

According to a preferred embodiment of the invention, the interior surface of said upper layer 6 forms a slope extending downward from the parabolic upper edge summit to the soil.

According to a preferred embodiment of the invention, said interior surface of the upper layer 6 has a flattened hemi-dome shape.

The thickness of said upper layer 6 is preferably between 80 mm and 160 mm, more preferably between 100 mm and 140 mm and particularly preferably 120 mm.

As the upper layer 6 extends to the height of the lower edge 3 of said front open side 3, said upper layer 6 form the contact points between the reef replacement system 1 according to the invention with the floor and delimits its footprint.

Said footprint has a maximum length, from the vertical open side 2 to the rear end 9 of the reef replacement system, preferably between 1800 mm and 2200 mm, more preferably between 1900 mm and 2100 mm and very particularly preferably 2000 mm.

The reef replacement system 1 according to the invention also comprises, inside the volume below said upper, at least two super-imposed cavities 10, 10' and more preferably only two super-imposed cavities 10, 10'. Said cavities 10, 10' are designed to be fish habitations.

Said cavities 10, 10' are separated by a flat horizontal platform 7 extending from said front vertical open side 2 to the interior surface of said upper layer 6. The thickness of said flat horizontal platform 7 is preferably between 120 mm and 200 mm, more preferably between 140 mm and 180 mm and particularly preferably 160 mm.

According a preferred embodiment of the invention, said flat horizontal platform 7 is disposed in such a manner as to create two cavities 10, 10' having the same maximal height.

In order to support the total weight of said flat horizontal platform 7 and to create more complexity in the lower cavity 10' the reef replacement system 1 according to the invention comprises at least one footing 8 extending from said platform to the soil. According to a more preferred embodiment, the reef replacement system 1 according to the invention comprises two footings 8 disposed near the edge of said horizontal platform 7 in such a way as to separate said edge in three portions of equal length.

In order to accommodate coral growth, the reef replacement system 1 according to the invention further comprises at least one, more preferably at least eight horizontal outer platform 11 extending from the exterior surface of said upper layer 6. Said horizontal outer platform 11 has preferably an upper area between 2000 cm$^2$ and 3000 cm$^2$.

Advantageously, the cavities 10, 10' inside the reef replacement system according 1 to the invention are accessible from the vertical open side 2 but also from the upper layer 6 through holes 12, 12', 12" crossing right through said upper layer 6.

Advantageously, said hole 12, 12', 12" has a cross section between 25 and 35 cm$^2$.

Advantageously, the reef replacement system 1 according to the invention comprises at least three holes 12, 12', 12' and more preferably only three holes 12, 12', 12". One of said holes 12 communicating with the highest cavity 10 and two 12', 12' with the lowest cavity 10'.

Preferably, the two holes 12', 12" communicating with the lowest cavity 10' are in the lowest part of the edge of said upper layer 6. With this respect, the limit of said hole 12', 12" is formed by the edge of the upper layer 6 and by the seafloor.

Preferably, the two holes 12', 12" communicating with the lowest cavity 10" are disposed in such a manner as delimited the lowest part of the upper layer 6 in three equivalent portions.

The reef replacement system 1 according to the invention can be made in various materials. But, in order to maximize coral attachment and growth, the reef replacement system 1 according to the invention is preferably made of concrete and even more preferably of concrete comprising micro silica in order to reduce the porosity of said concrete.

The use of concrete allows the production of the reef replacement system 1 according to the invention, in one piece by moulding techniques.

The one skilled in the art is able to design and use a mould dedicated for that purpose. As the rugosity of the surface of the reef replacement system 1 according to the invention is an important parameter for the coral attachment and growth, the surface of the mould is preferably treated with a retarding admixture and more preferably with a non-toxic retarding admixtures such as sucrose.

According to a preferred embodiment, the rugosity of the exterior surface of said upper layer 6 is comprised between 0.08 and 0.1.

Compared to the previously available system, the reef replacement system 1 according to the invention provides a more enclosed fish refuge and a cost effective way of diversifying reef structure design and function.

The system 1 according to the invention is easy to put in place the top hole 12 allows for easy slinging and deployment to sea by either vessel mounted crane or buoyancy floatation devices. The placement of the holes 12, 12', 12" allow for the system 1 to hang flat (i.e. at the centre of gravity) and thus facilitate level placement on the seafloor.

The system 1 according to the invention can be cast in concrete within a mould, it is strong and durable. This is important to ensure its longevity within the marine environment.

While preferred embodiments of the invention have been described with reference to the accompanying drawings, such description is for illustrative purposes only and the invention is not limited to the description.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A reef replacement system comprising:
   a front vertical open side defined by a horizontal lower edge and a parabolic upper edge, said parabolic upper edge is at its highest point, between 400 mm and 800 mm high and at its lowest point, between 1600 mm and 2400 mm wide,
   an upper layer having a front edge defining the parabolic upper edge, the upper layer extending from a maximum height that is approximately equivalent to a summit of said parabolic upper edge and forming a slope extending downward from the parabolic upper edge summit to a height approximately equivalent to the height of said lower edge, the slope extending rearwardly and laterally from the front vertical open side, and
   at least two super-imposed cavities underneath said upper layer, each cavity of the super-imposed cavities having an opening facing the front vertical open side,
   wherein the front vertical open side is strictly vertical or is angled forward, such that the summit of the parabolic upper edge is disposed either directly above or forwardly of the horizontal lower edge.

2. The reef replacement system according to claim 1, wherein the reef replacement system further comprises at least one horizontal outer platform extending from the exterior surface of said upper layer.

3. The reef replacement system according to claim 1, further comprising at least one footing extending vertically from said flat horizontal platform to the soil.

4. The reef replacement system according to claim 1, wherein the reef replacement system is made of concrete.

5. The reef replacement system according to claim 1, wherein the reef replacement system is obtained by molding.

6. The reef replacement system according to claim 1, wherein the rugosity of the exterior surface of said upper layer is comprised between 0.08 and 0.1.

7. The reef replacement system according to claim 1, wherein the slope formed by said upper layer is between 30° and 50°.

8. The reef replacement system according to claim 1, further comprising a hole extending from the upper surface of said upper layer to one of the superimposed cavities.

9. The reef replacement system according to claim 8, further comprising two additional holes in the lowest part of the edge of said upper layer, extending from the outer surface of said upper layer to the lowest super-imposed cavity.

10. The reef replacement system according to claim 1, further comprising:
    at least one first hole formed through said upper layer and communicating with a lowest of said super-imposed cavities, and
    at least one second hole formed through said upper layer and communicating with a highest of said super-imposed cavities,
    wherein each cavity of the super-imposed cavities has an opening facing the front vertical open side.

11. The reef replacement system according to claim 1, wherein the front vertical open side enables access to a whole of each of the at least two superimposed cavities, with no physical structure, other than the at least one flat horizontal platform or the footing, interfering with the access.

12. The reef replacement system according to claim 1, further comprising at least one flat horizontal platform extending from said front vertical open side to the interior surface of said upper layer, said front horizontal platform separating said super-imposed cavities.

13. The reef replacement system according to claim 1, wherein the upper layer has an exterior surface and an interior surface, both the exterior surface and the interior surface extending from the parabolic upper edge and forming slopes extending downward from the parabolic upper edge summit to a height approximately equivalent to the height of said lower edge, the slopes extending rearwardly and laterally from the front vertical open side.

* * * * *